Dec. 28, 1943.     R. R. LONGWELL     2,337,830
PROTECTIVE PILOT WIRE CONTROL SYSTEM
Filed May 13, 1942
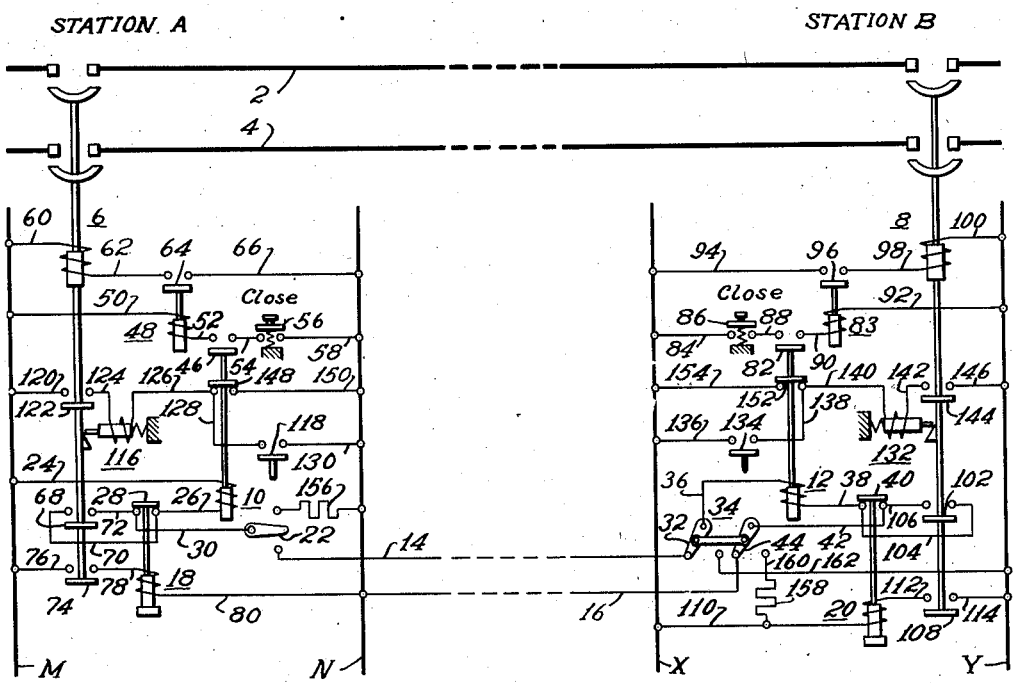
WITNESSES:
Edward Michaels
Joe Weber.
INVENTOR
Robert R. Longwell.
BY
ATTORNEY Patented Dec. 28, 1943

2,337,830

UNITED STATES PATENT OFFICE 2,337,830

PROTECTIVE PILOT WIRE CONTROL SYSTEM

Robert R. Longwell, Forest Hills, Pa., assignor to Westinghouse Electric & Manufacturing Company, East Pittsburgh, Pa., a corporation of Pennsylvania Application May 13, 1942, Serial No. 442,757

8 Claims. (Cl. 175—294)

The present invention relates, generally, to control systems, and, more particularly, to pilot wire control systems for simultaneously controlling the operation of circuit breakers which are disposed at widely separated points.

In the operation of electric power transmission circuits which extend between separate stations, it is often necessary after a circuit breaker on the circuit at one of the stations has been opened due to a fault on the circuit, that the circuit breaker on the circuit at the other station be opened before the circuit is again energized by closing either of the breakers. Thus when a fault occurs near one station on a circuit which extends between two stations the breaker at the one station may open due to the fault but the breaker at the second station may be too far from the fault to open in response to the fault and power would continue to be fed into the fault through the breaker at the second station.

It is an object of the present invention to provide a control system which shall function in response to the opening of any or certain circuit breakers on a power circuit at either of a plurality of stations to open other circuit breakers on the circuit before permitting reclosure of any of the breakers.

Other objects and advantages of the invention will be apparent from the following detailed description taken in connection with the accompanying drawing which is a diagrammatic representation of a control system embodying the principal features of the invention.

In practicing the invention, power conductors 2 and 4 extend between stations A and B and are controlled by circuit breakers 6 and 8 at the respective stations. Relays 10 and 12 at stations A and B are normally held energized in a series circuit which includes pilot conductors 14 and 16 which extend between the stations and contact elements of the respective circuit breakers 6 and 8 in closed circuit position. Auxiliary delayed-release relays 18 and 20 function to delay the reenergization of the relays 10 and 12 when they are deenergized by the opening of either of the breakers 6 and 8.

A more complete understanding of the functioning of the system and the cooperative relationships of the several elements of the system may be had from the following detailed description.

The elements of the system are all shown in the released position in the drawing. When it is desired to place the system into operation, the contact element 22 may be moved to its lower contact position to close an energizing circuit for the relays 10 and 12 extending from a control bus M through a conductor 24, the winding of the relay 10, a conductor 26, a contact element 28 of the relay 18, a conductor 30, the contact element 22, the conductor 14, a contact element 32 of a double-pole double-throw switch 34, a conductor 36, the winding of the relay 12, a conductor 38, a contact element 40 of the relay 20, a conductor 42, a contact element 44 of the switch 34 and the conductor 16 to a control bus N.

A contact element 46 of the relay 10 constitutes part of an energizing circuit for a relay 48 which circuit extends from the bus M through a conductor 50, the winding of the relay 48, a conductor 52, the contact element 46, a conductor 54, a contact element 56 and a conductor 58 to the bus N. The energization of the relay 48 will close an energizing circuit for the closing coil of the circuit breaker 6 which extends from the bus M through a conductor 60, the closing coil of the circuit breaker 6, a conductor 62, a contact element 64 of the relay 48 and a conductor 66 to the conductor N. A contact element 68 actuated by the circuit breaker 6 will close a shunting circuit for the contact element 28 of relay 18 extending from the conductor 26 through a conductor 70, the contact element 68 and a conductor 72 to the conductor 30 so that when the circuit breaker 6 is in closed position the contact element 68 will complete the energizing circuit for the relay 10. A contact element 74 actuated by the circuit breaker 6 closes an energizing circuit for the delayed-release relay 18 extending from the bus M through a conductor 76, the contact element 74, a conductor 78, the winding of the relay 18, and a conductor 80 to the bus N.

A contact element 82 of the relay 12 constitutes part of an energizing circuit for a relay 83, which circuit extends from a control bus X through a conductor 84, a contact element 86, a conductor 88, the contact element 82, a conductor 90, the winding of the relay 83 and a conductor 92 to a control bus Y. The relay 83 when actuated will close an energizing circuit for the closing coil of the circuit breaker 8 extending from the bus X through a conductor 94, a contact element 96 of the relay 83, a conductor 98, the closing coil of the circuit breaker 8 and a conductor 100 to the bus Y. A contact element 102 actuated by the circuit breaker 8 closes a shunting circuit for the contact element 40 of the relay 20 which extends from the conductor 38 through a conductor 104, the contact element 102 and a conductor 106 to the conductor 42. Thus when the circuit breaker 8 is in closed position its contact element 102 forms part of the energizing circuit for the relays 10 and 12. When the circuit breaker 8 is in closed position a contact element 108 actuated by the circuit breaker closes an energizing circuit for the relay 20 extending from the bus X through a conductor 110, the winding of the relay 20, a conductor 112, the contact element 108 and a conductor 114 to the bus Y.

An electrically trippable latch device 116 is disposed to hold the circuit breaker 6 in closed circuit position and to trip the circuit breaker to open circuit position when energized. An energizing circuit for the trip-latch device 116 may be energized by a contact element 118 in a circuit extending from the bus M through a conductor 120, a contact element 122 actuated by the circuit breaker 6, a conductor 124, the winding of the trip-latch device 116, conductors 126 and 128, the contact element 118, and a conductor 130 to the bus N.

A similar electrically trippable latch device 132 for the circuit breaker 8 may be energized by the contact element 134 in a circuit extending from the bus X through a conductor 136, the contact element 134, conductors 138 and 140, the winding of the trip-latch device 132, a conductor 142, a contact element 144 actuable by the circuit breaker 8 and a conductor 146 to the conductor Y. A contact element 148 of the relay 10 may also close an energizing circuit for the trip-latch device 116 extending from the bus M through a conductor 120, the conductor element 122, the conductor 124, the winding of the trip-latch device 116, the conductor 126, the contact element 148 and a conductor 150 to the bus N. Similarly, a contact element 152 of the relay 12 is disposed to close an energizing circuit for the trip-latch device 132 extending from the bus X through a conductor 154, the contact element 152, the conductor 140, the winding of the trip-latch device 132, the conductor 142, the contact element 144 and the conductor 146 to the bus Y.

When it is desired to operate the individual sets of apparatus at the stations A and B without the pilot conductors 14 and 16, the contact element 22 at the station A may be actuated to the upper contact position to thereby close an energizing circuit for the relay 10 extending from the bus M through the conductor 24, the winding of the relay 10, the conductor 26, the contact element 28, the conductor 30, the contact element 22 and a current limiting resistor 156 to the conductor N. Similarly, the contact elements 32 and 44 of the control switch 34 may be actuated to the right hand contact position to close an energizing circuit for the relay 12 at the station B extending from the bus X through the conductor 118, a current limiting resistor 158, a conductor 160, the contact element 44, the conductor 42, the contact element 40, the conductor 38, the winding of the relay 12, the conductor 36, the contact element 32 and a conductor 162 to the bus Y.

In the operation of the system, when it is desired to place the system into operation, with the control switch 34 in the position indicated in the drawing and the contact element 22 in the lower contact position, the relays 10 and 12 will be energized and the circuit breakers 6 and 8 may be closed by actuating the contact elements 56 and 66, respectively.

The closure of contact elements 74 and 108 will energize the relays 18 and 20, respectively, and these relays as well as the relays 10 and 12 will be held in actuated position so long as the circuit breakers 6 and 8 are in closed circuit position. If, now, for any reason, such as the occurrence of a fault on the conductors 2 and 4, the contact element 118 should be actuated to closed circuit position, the latch device 116 will be actuated as described hereinbefore to trip the circuit breaker 6. When the circuit breaker 6 is opened, its contact element 68 will open the series energizing circuit for the relays 10 and 12 and its contact element 74 will open the energizing circuit for the delayed-release relay 18. The release of the relay 12 at the station B will cause its contact element 152 to move to closed circuit position to close the energizing circuit for the latch device 132 to thereby open the circuit breaker 8. When the circuit breaker 8 is opened, its contact element 108 will break the energizing circuit for the delayed-release relay 20.

It will be seen that there will be no series energizing circuit for the relays 10 and 12 between the time that the circuit breaker 6 opens and the time when the delayed-release relays 18 and 20 are fully released to close their contact elements 28 and 40. After this period of delay, which is provided to insure the full tripping of the circuit breaker 8 after the circuit breaker 6 is tripped before the circuit breaker 6 can be closed, the contact elements 28 and 40 will complete the energizing circuit for the relays 10 and 12, and the contact elements 46 and 62 of the relays 10 and 12, respectively, will be moved to closed circuit position. With the contact element 46 in closed circuit position the circuit control device 56 may be again actuated to close the circuit breaker 6 and with the contact element 62 in closed circuit position the contact element 66 may be actuated to close the circuit breaker 8 as hereinbefore described.

Should the circuit breaker 8 be tripped by the closure of the contact element 134, its contact elements 102 and 108 will function in the manner hereinbefore described in connection with the operation of the contact elements 68 and 74 of the circuit breaker 6 to release the relays 10, 12, 18 and 20 and to insure the tripping of the circuit breaker 6 before the closing circuit for either of the circuit breakers is made operative.

It is to be understood that the contact elements 118 and 134 may be any contact elements which are made to function in response to a condition which makes it desirable that the respective circuit breakers be opened. It is also to be understood that the contact elements 56 and 66 may be manually actuable contact elements or may be contact elements of automatic circuit breaker closing devices. It is further to be understood that the system is not limited in its function to two associated stations but may be applied to as many stations as desired with conductors similar to conductors 14 and 16 and relays similar to relays 10 and 12 at each of the stations forming a normally energized series circuit. Thus it will be seen that I have provided a control system which shall function in response to the opening of any or certain circuit breakers on a power circuit at either of a plurality of stations to open other circuit breakers on the circuit before permitting the closure of any of the breakers, which system is simple and efficient in construction, operation and maintenance.

In compliance with the requirements of the patent statutes, I have shown and described herein a preferred embodiment of my invention. It is to be understood, however, that the invention is not limited to the precise construction shown and described but is capable of modification by one skilled in the art, the embodiment herein shown being merely illustrative of the principles of my invention.

I claim as my invention:

1. In a control system for circuit breakers provided with closing and opening means disposed at different locations, a conducting channel extending between the different locations, an auxiliary relay at each of the locations, a contact element actuable to closed circuit position by the closure of each of the circuit breakers, a circuit for energizing said auxiliary relays in series circuit relation comprising said conducting channel and said circuit breaker actuable contact elements connected in said circuit in series relation whereby the opening of any one of the breakers releases all of the auxiliary relays, and means operable by the release of each of said auxiliary relays for opening its associated circuit breaker, whereby the opening of any one of the breakers effects the opening of another breaker.

2. In a control system for a plurality of circuit breakers provided with closing and opening means and which are located at different stations, a conducting channel extending between said stations, an auxiliary relay at each of said stations, each of said auxiliary relays being effective when energized to render the closing means of its associated breaker effective and effective when deenergized to operate the opening means of its associated breaker, means at each station operable to operate the opening means of the breaker thereat independently of the auxiliary relay, a series energizing circuit including said conducting channel for the auxiliary relays, means responsive to the opening of any one of the breakers for interrupting the series energizing circuit to effect the deenergization and release of all of said auxiliary relays at all stations whereby the opening of one of the breakers effects the opening of another breaker and the closing means of all breakers are rendered inoperable, and a plurality of timing relays each associated with a breaker responsive to the opening of their associated breaker for collectively reestablishing the series energizing circuit after a predetermined timing period to reenergize the auxiliary relays, thereby to insure that all breakers have been opened in response to the opening of any one of the breakers and to prevent reclosure of any one of the breakers until all have opened.

3. In a control system for a plurality of circuit breakers provided with closing and opening means and which are located at different stations, a conducting channel extending between the stations, an auxiliary relay at each of said stations, each of said auxiliary relays being effective when energized to render the closing means of its associated breaker effective and when energized to operate the opening means of its associated breaker, means at each station operable to operate the opening means of the breaker thereat independently of the auxiliary relay, an energizing circuit including said conducting channel for energizing the auxiliary relays at all stations in series circuit relation whereby the interruption of the energizing circuit at any station will effect the release of all of the auxiliary relays, a timing relay at each station having contact members which are opened and closed in accordance with the closing and opening operations, respectively, of its associated breaker, said series energizing circuit for the auxiliary relays including the contact members of all the timing relays, whereby the energizing circuit is completed when all of the breakers are open and interrupted when any one of the breakers is closed, contact members on each breaker connected in bridging relation with the contact members of their associated timing relays for maintaining the energizing circuit closed when all of the breakers are closed and all of the timing relays are open, whereby the opening of any one of the breakers effects the opening of all breakers through the release of the auxiliary relays and the reclosure of any breaker is prevented until all breakers have opened to effect the release of all the timing relays.

4. In a control system for a plurality of circuit breakers disposed at different stations on a common power circuit, closing and opening means for each breaker, a conducting channel extending between the stations, a relay associated with each of the breakers, a circuit including said conducting channel for energizing said relays in series circuit relation, means responsive to the release of each of said relays for opening its associated breaker, means actuated by each breaker for interrupting the series energizing circuit in response to the opening of any one of the breakers, and additional means at each station operable to effect an opening of the breaker thereat, whereby the opening of one breaker effects the opening of another breaker.

5. In a control system for a plurality of circuit breakers disposed at different locations, means for opening each of the breakers, means for closing each of the breakers, a conducting channel extending between said breakers, and relay means associated with each breaker and actuated over said channel responsive to the opening of one of the breakers for actuating the opening means of the other breaker and rendering the closing means of each of the breakers ineffective for a predetermined time.

6. In a control system for a plurality of circuit breakers disposed at different stations, opening means for each of the breakers, closing means for each of the breakers, a normally energized relay at each of the stations, means responsive to the release of said normally energized relays for rendering their associated breaker closing means inoperative and actuating the opening means for the breakers that are closed, means responsive to the opening of any one of the breakers for collectively releasing all of said normally energized relays, and time delayed relay means associated with each breaker and responsive to the opening thereof for reenergizing said normally energized relays after a predetermined time delay.

7. In a control system for a plurality of circuit breakers which are disposed at different stations, opening means for each of the breakers, closing means for each of the breakers, a conducting channel extending between the stations, an auxiliary relay at each of the stations, a circuit including said conducting channel for energizing said auxiliary relays in series circuit relation, means responsive to the opening of any of the breakers for opening the series energizing circuit for the auxiliary relays to effect the release of all of said auxiliary relays, circuit means whereby the release of the auxiliary relays renders their respective associated breaker closing means inoperative and actuates the opening means for the closed breakers, and a timing relay associated with each of the breakers operable in response to the opening of each of the breakers for reestablishing the series energizing circuit for the auxiliary relays at the end of the timing period of all of the timing relays.

8. In a control system for a plurality of circuit breakers which are disposed at different stations, opening means for each of the breakers, closing means for each of the breakers, pilot conductors extending between the stations, an auxiliary relay at each of the stations, a circuit including said pilot conductors for energizing said auxiliary relays in series circuit relation, switch means responsive to the opening of each of the breakers for opening the series energizing circuit for the auxiliary relays to cause all of said relays to open, circuit means whereby the release of the auxiliary relays renders their respective associated breaker closing means inoperative and actuates the opening means for the closed breakers, a timing relay associated with each of the breakers, means responsive to the opening of each of the breakers for starting the timing period of its associated timing relay, means whereby the series energizing circuit for the auxiliary relays is reestablished at the end of the timing period of all of the timing relays, and means at each station for transferring the auxiliary relay at that station from the series energizing circuit which includes the pilot conductors to an energizing circuit at the station.

ROBERT R. LONGWELL.